US007854065B2

(12) United States Patent
Saito et al.

(10) Patent No.: US 7,854,065 B2
(45) Date of Patent: Dec. 21, 2010

(54) LIQUID DISCHARGE HEAD MANUFACTURING METHOD

(75) Inventors: Yoshikazu Saito, Kawasaki (JP); Shoji Shiba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 12/169,286

(22) Filed: Jul. 8, 2008

(65) Prior Publication Data

US 2009/0025221 A1 Jan. 29, 2009

(30) Foreign Application Priority Data

Jul. 27, 2007 (JP) ............................ 2007-196326

(51) Int. Cl.

| | |
|---|---|
| ***B23P 17/00*** | (2006.01) |
| ***B21D 53/76*** | (2006.01) |
| ***B29C 65/00*** | (2006.01) |
| ***B31B 1/60*** | (2006.01) |
| ***B32B 37/00*** | (2006.01) |
| ***B41J 2/14*** | (2006.01) |
| ***B41J 2/16*** | (2006.01) |

(52) U.S. Cl. ..................... 29/890.1; 156/60; 156/272.2; 347/47

(58) Field of Classification Search ................ 29/890.1; 156/60, 78, 272.2, 273.7; 347/44, 47; 430/270.1
See application file for complete search history.

(56) References Cited

U.S. PATENT DOCUMENTS 4,558,333 A 12/1985 Sugitani et al.
5,916,452 A 6/1999 Kobayashi et al.
6,123,863 A 9/2000 Shimomura et al.
6,318,842 B1 11/2001 Shimomura et al.
2006/0033784 A1 2/2006 Keenan et al.
2006/0188826 A1 * 8/2006 Tseng et al. ................ 430/322
2006/0277755 A1 12/2006 Kubota et al.
2007/0099121 A1 * 5/2007 Kubota et al. ............... 430/311
2007/0132811 A1 6/2007 Okano et al.
2008/0018712 A1 1/2008 Saito et al.

* cited by examiner

*Primary Examiner*—A. Dexter Tugbang
*Assistant Examiner*—David P Angwin
(74) *Attorney, Agent, or Firm*—Fitzpatrick, Cella, Harper & Scinto

(57) ABSTRACT

A manufacturing method for a liquid discharge head that includes a discharge port forming die member, where discharge ports for discharging liquid are formed, and liquid flow paths that communicate with the discharge ports, includes the steps of mounting, on a substrate, a first side wall forming member for forming portions of side walls of the liquid flow paths, forming, on the first side wall forming member, a first photosensitive material layer that serves as a second side wall forming member for formation of the other portions of the side walls, patterning the first photosensitive material layer to provide the second side wall forming member, forming, on the second side wall forming member, a second photosensitive material layer that serves as the discharge port forming member, and patterning the second photosensitive material layer to provide the discharge ports.

5 Claims, 3 Drawing Sheets

LIQUID DISCHARGE HEAD MANUFACTURING METHOD

BACKGROUND OF THE INVENTION

1. Field of the Invention

The present invention relates to a method for manufacturing a liquid discharge head, and more particularly relates to a method for manufacturing an ink jet recording head that discharges ink for printing of a recording medium.

2. Description of the Related Art

An example liquid discharge head for discharging a liquid is an ink jet recording head employed for an ink jet recording system.

Referring now to the ink jet recording head, one consistent existing demand, to facilitate the printing of images having improved visual qualities, is a reduction in the size of the liquid droplets that are emitted, and another is a manufacturing technique for the precise production of a structure having minute ink flow paths and ink discharge ports. As such a manufacturing technique, photolithography is superior in both precision and simplicity. Thus, a photosensitive resin is an appropriate material for an ink jet recording head, and generally, a material cured through cationic polymerization is especially appropriate because the ink resistance provided by such a material is superior to that provided by a material cured through radical polymerization.

Photolithographic methods for manufacturing ink jet heads are disclosed in U.S. Pat. No. 4,558,333 and U.S. Patent Application Publication No. 2006/0033784. According to the method disclosed in U.S. Pat. No. 4,558,333, first, an ink flow path pattern is formed, using a first photosensitive resin, on a substrate on which ink discharge energy generating elements are mounted. And then, a second photosensitive resin layer is adhered by being laminated to the ink flow path pattern, and thereafter, ink discharge ports are formed in the second photosensitive layer. According to the method disclosed in U.S. Patent Application Publication No. 2006/0033784, first, an ink flow path pattern is formed, using a first photosensitive resin, on a first substrate on which ink discharge energy elements are mounted. Then, a top plate (called an orifice plate), which is composed of a second photosensitive resin and has ink discharge ports, is deposited on a second substrate. Thereafter, the orifice plate is thermally bonded to the ink flow path pattern, and the second substrate is removed.

For an ink jet recording head constructed in accordance with this latter method, to facilitate the discharge of minute ink droplets with which to provide high-quality recording, there must be as little distance as possible between the ink discharge energy generating elements and the ink discharge ports. Thus, lowering the height of the ink flow paths is also necessary, as is reducing the sizes of ink discharge ports and those of ink bubbling chambers, which are inherent constituents of the ink flow paths and which contact the ink discharge energy generating elements. That is, for an ink jet recording head constructed in accordance with the above described method to discharge minute ink droplets, during the lamination of an ink flow path structural member on a substrate, the thickness must be closely monitored and controlled.

Furthermore, with the objective of performing a high-speed and stable ink discharge operation, it is preferable that ink flow paths, when formed, have an arbitrary three-dimensional shape and a height that is changed in the direction of the height of the substrate.

According to the manufacturing method described in U.S. Pat. No. 4,558,333, a photosensitive resin layer to be used as an orifice plate is formed as a dry film on a flexible film base, and therefore, the suitable materials available, from which to make a selection, are limited.

In addition, it is preferable that heat and pressure be employed to laminate on the substrate the dry film in which the ink flow path pattern is formed. However, when heat and pressure are used, the dry film in which the ink flow paths are formed may be deformed, and the resin may sag and enter ink flow paths, so that accurately shaping all the ink flow paths will be difficult.

Further, the dry film used to provide an orifice plate must be thin and even in order to reduce the thickness of the ink flow path structure member. However, it is difficult to form a thin dry film by general coating means. Even if a thin dry film is deposited, it would be very difficult to bond the thin dry film to a substrate bearing the ink discharge energy generating elements and the ink discharge pattern, because a thin-film orifice plate will be fragile.

According to the manufacturing method described in U.S. Patent Application Publication No. 2006/0033784, when an orifice plate is to be bonded to a substrate on which ink discharge energy generating elements are mounted and ink flow paths are formed, a limitation is imposed on the accuracy of the alignment of the ink discharge energy generating elements and the ink flow path pattern with the ink discharge ports. That is, an undesirable manufacturing variance is quite easily generated that affects the discharge characteristics of an ink jet recording head.

In addition, because of the simplicity of the bonding process, thermal adhesion of the photosensitive resins is appropriate. However, when a negative photosensitive resin is employed, this resin has already been cured by the time photolithography is employed to form the ink discharge ports and the ink flow paths. Therefore, when negative photosensitive resins are to be adhered thereafter, an extremely high temperature may be required; either this, or the performance of the thermal adherence process may itself be difficult.

SUMMARY OF THE INVENTION

One objective of the present invention is to provide a liquid discharge head manufacturing method whereby flow paths, having an arbitrary three-dimensional shape, can be formed and for which there is almost no applicable limitation affecting the selection of a material for an orifice plate, and for which highly accurate alignment is not a prerequisite when the individual component members are to be bonded.

According to one aspect of the present invention, a manufacturing method, for a liquid discharge head that includes a discharge port forming die member, where discharge ports for discharging liquid are formed, and liquid flow paths that communicate with the discharge ports, comprises the steps of: mounting, on a substrate, a first side wall forming member for forming portions of side walls of the liquid flow paths; forming, on the first side wall forming member, a first photosensitive material layer that serves as a second side wall forming member for formation of the other portions of the side walls; patterning the first photosensitive material layer to provide the second side wall forming member; forming, on the second side wall forming member, a second photosensitive material layer that serves as the discharge port forming member; and patterning the second photosensitive material layer to provide the discharge ports.

According to this liquid discharge head manufacturing method, flow paths can be formed that have an arbitrary three dimensional shape, and little or no limitation is imposed on the selection of a material to be used for the orifice plate. As a result, a liquid discharge head can be obtained wherein the flow paths and the discharge ports are very accurately formed at corresponding locations.

Further features of the present invention will become apparent from the following description of exemplary embodiments with reference to the attached drawings.

DESCRIPTION OF THE EMBODIMENTS

Figure 1:
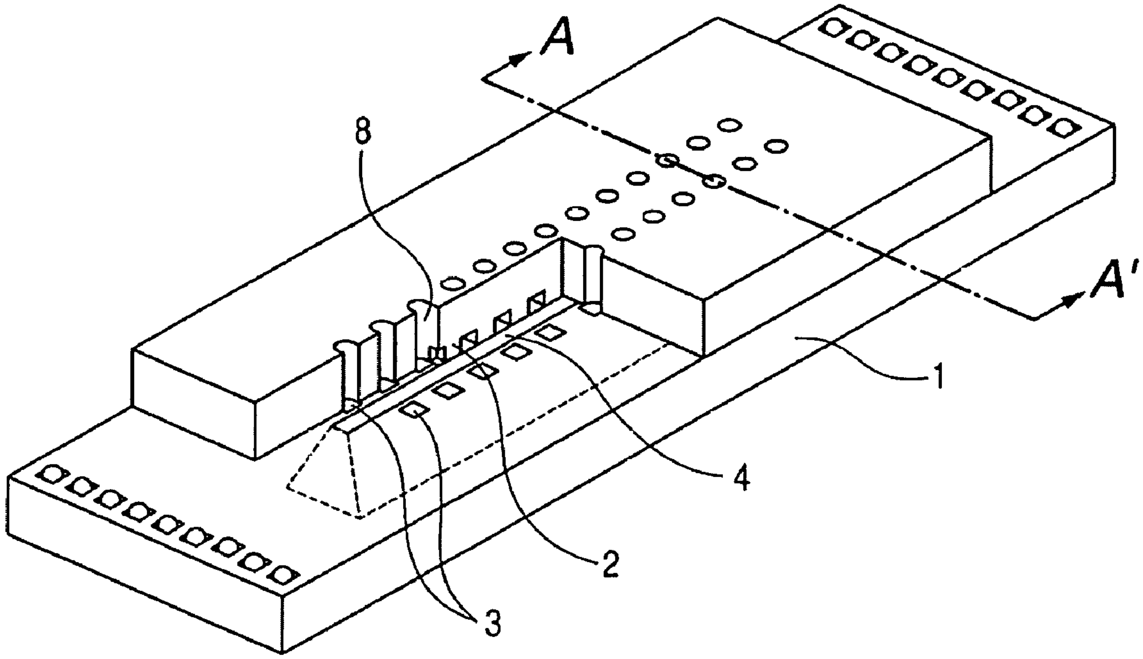
FIG. 1 is a schematic perspective view illustrating an example ink jet recording head according to the present invention.

The embodiments of the present invention will now be described while referring to the accompanying drawings. In the following embodiments, components referred to in the drawings that have like functions are denoted by the same reference numerals, and repetitious descriptions thereof are omitted.

An ink jet recording head is employed as an example liquid discharge head for which the present invention is applied; however, application of the present invention is not limited to the manufacture of an ink jet recording head, and additional applications may include the creation of a biochip and the printing of an electronic circuit.

First, an ink jet recording head (hereinafter referred to as a recording head) will be described for which the present invention can be applied.

FIG. 1 is a schematic diagram illustrating a recording head according to the preset invention.

As shown in FIG. 1, the recording head of this invention includes a substrate 1, on which two arrays of energy generating elements 3 are formed, at predetermined pitches, to generate energy for the discharge of ink. An ink supply port 4 is opened in the substrate 1, between the two arrays of energy generating elements 3, and a flow path forming-die member 2, mounted on the substrate 1, provides individual ink flow paths, which communicate with ink discharge ports 8, that are open from the ink supply port 4 to locations above the respective energy generating elements 3.

That is, the ink jet recording head manufactured by a method of this invention includes: the ink discharge ports 8 for discharging ink; the ink supply port 4 for supplying ink; and the ink discharge energy generating elements 3 for generating energy to discharge ink. The ink discharge ports 8 and the ink supply port 4 are connected by the ink flow paths, and the ink discharge energy generating elements 3 are enclosed within the ink flow paths.

The individual processes of the manufacturing method of this invention will now be described by employing the drawings.

Figure 2A:
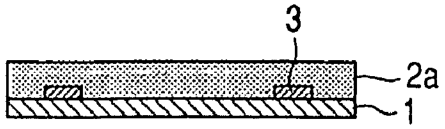
FIGS. 2A, 2B, 2C, 2D, 2E, 2F, 2G and 2H are schematic cross sectional views taken along a line A-A' in FIG. 1, illustrating an example ink jet recording head manufacturing method according to a first embodiment of the present invention.

First, as shown in FIG. 2A, the first rigid substrate 1, on which the ink discharge energy generating elements 3 are arranged, is prepared (step S1), and a first thin film **2*a* is deposited on the first rigid substrate 1 (step S2**).

The first rigid substrate 1 is composed of glass, ceramic or metal, but the material employed for the substrate 1 is not limited to these. However, a substrate, of whatever material, should be rigid enough to adequately withstand almost any degree of deformation during a succeeding bonding process. Furthermore, since a conventional semiconductor manufacturing technique can easily be employed for the fabrication of the ink discharge energy generating elements 3 and associated electrodes, for the first rigid substrate 1, an appropriate material is one of the silicons.

Although electrothermal energy generating elements or piezoelectric elements are employed as the ink discharge energy generating elements 3, the energy generating elements 3 are not limited to these two types. Further, as additions to the above described arrangement, control signal input electrodes (not shown) are connected to and drive the ink discharge energy generating elements 3, and also, a protective layer may be deposited on the ink discharge energy generating elements 3 to improve durability.

The first thin film **2*a* is composed of a resin, a glass, a ceramic or a metal; however, so long as a first ink flow path pattern can be formed later, the materials that can be used for the first thin film 2*a* are not limited to the ones listed here. A photosensitive resin is especially appropriate for the material of the first thin film 2*a*, because photolithography can be used to easily and accurately form an ink flow path pattern. To deposit the first thin film 2*a***, consonant with the material thereof, an arbitrary method can be selected from among the vapor evaporation, spin coating, plating, lamination and spray coating processes.

The employment of a negative photosensitive resin cured through cationic polymerization is more appropriate, because in the cured state, the resin is superior in ink resistance to a negative photosensitive resin cured through radical polymerization. A negative photosensitive resin for which cationic polymerization reaction is employed generally contains a cationic photopolymerization initiator and a cationically polymerizable monomer. To cure the photosensitive negative resin, cations are generated by the cationic photopolymerization initiator contained in the negative photosensitive resin, and using the cations, polymerization or bridging is advanced between the molecules of the cationically polymerizable monomer of the negative photosensitive resin until curing of the negative photosensitive resin has been completed.

Either aromatic iodonium salt or aromatic sulfonium salt can be employed as a cationic photopolymerization initiator. Specifically, one of either SP-170 or SP-150 (product names), by ADEKA Corp., one of either BBI-103 or BBI-102 (product names), by Midori Kagaku Co., Ltd., or Rhodorsil Photoinitiator 2074 (product name), by Rhodia Japan, Ltd. can be employed.

As a cationically polymerizable monomer, a monomer containing an epoxy group, a vinyl ether group or an oxetane group is appropriate, but the selection of the monomer to be used is not thereby limited. Further, an appropriate epoxy resin can be bisphenol-A epoxy resin, novolac epoxy resin or alicyclic epoxy resin; however, no limitation is imposed on the resin that can be used. The alicyclic epoxy resin can be either one of a Celloxide 2021 and a GT-300 series, one of a GT-400 series or an EHPE 3150 (product names), by Daicel Chemical Industries, Ltd. These monomers can be employed individually, or a mixture of two or more may be employed.

In addition, an additive may be included, as needed, in the negative photosensitive resin that uses a cationic photopolymerization reaction. For example, a silane coupling agent may be added in order to increase the adhesion relative to the first rigid substrate 1.

Further, one of either a SU-8 series or KMPR-1000 (product names), by Kayaku MicroChem Co., Ltd., or one of either TMMR S2000 or TMMF S2000 (product names), by Tokyo Ohka Kogyo Co., Ltd., may be employed to form the first thin film 2*a*.

The thickness of the first thin film 2*a* is normally 1 to 100 μm; however, the film thickness is not limited to this thickness.

Figure 2B:
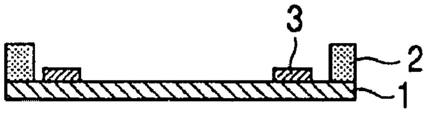

After the first thin film 2*a* has been deposited on the substrate 1, as shown in FIG. 2B, the first thin film 2*a* is machined to shape, at predetermined locations, a first pattern 2, which then serves as a first side wall forming member that provides portions of the side walls of ink flow paths at a first level (step S3). The ink flow paths at the first level become part of the ink flow paths that are finally obtained.

Photolithography, etching or sandblasting can be appropriately selected, consonant with the material of the first thin film 2*a*, as the method used to form the first pattern 2. But as is described above, from the viewpoint of precision and of processing simplicity, photolithography is notably superior.

Figure 2C:
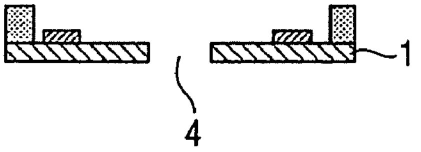

Next, as shown in FIG. 2C, the ink supply port 4 is formed in the first rigid substrate 1. Generally, wet etching, dry etching, laser machining or sandblasting can be employed to form the ink supply port 4. As an example, the anisotropic etching method will be described for a case wherein a silicon substrate having a specific crystal orientation is employed as the first rigid substrate 1. First, the portion of the face of the first rigid substrate 1 whereon the first thin film 2*a* is formed is covered with a protective layer made of an etching solution resistant resin. Then, the portion of the face of the rigid substrate 1 whereon the first thin film 2*a* has not been formed is covered with an etching mask, so that a portion that will become the ink supply port 4 can be exposed through a slit in the etching mask. Sequentially, thereafter, the first rigid substrate 1 is immersed in an alkaline etching solution consisting of either potassium hydroxide, sodium hydroxide or tetra methyl ammonium hydroxide. As a result, only the portion exposed through the slit in the etching mask is melted, and the ink supply port 4 is formed. Thereafter, the protective layer is removed from the face on the thin film 2*a* side, and the etching mask is removed as needed.

The process for forming the ink supply port 4 need not be performed immediately after the ink flow paths at the first level have been formed. That is, this process may be performed either before or immediately after the first thin film 2*a* is deposited on the first rigid substrate 1, and an appropriate time can be selected during the manufacturing processing, which includes succeeding steps that will be described later.

Figure 2D:

Parallel to the process performed up to step S4, as shown in FIG. 2D, a second rigid substrate 5, which differs from the first rigid substrate 1, is prepared (step S4), and a second thin film 6 is deposited on the second rigid substrate 5 (step S5).

The second rigid substrate 5 can be made of glass, ceramic or metal, but other materials can also be employed. However, the substrate that is obtained should be rigid enough that, during the succeeding bonding process, there is little or no chance that the substrate will be deformed.

The second thin film 6 can be made of a resin, a glass, a ceramic or a metal; however, so long as a second ink flow path pattern can be formed, other materials can also be employed. A photosensitive resin is especially appropriate for the second thin film 6, because the machining using photolithography can be employed, and the bonding to the first thin film 2*a*, wherein the ink flow paths at the first level are formed, can be easily performed using thermo compression. A negative photosensitive resin employing a cationic polymerization reaction is especially appropriate, and the example resins listed for the first thin film 2*a* can also be employed. The material used for the second thin film 6 may either be the same, or may differ from the one used for the first thin film 2*a*, but while taking into consideration the fact that the two films will be bonded, one to the other, the same material is preferable.

To form the second thin film 6, vapor evaporation, spin coating, plating, lamination or spray coating can appropriately be selected, in consonance with the material used for the second thin film 6. Of the methods available, spin coating is preferable, because the process is simple, and because when a thin film is formed, a uniform film thickness will be accurately applied. Furthermore, for this purpose, a large material selection is available.

The film thickness of the second thin film 6 is generally 0.5 to 20 μm; however, the film thickness can be adjusted as deemed necessary.

Further, pursuant to the need for the second rigid substrate 5 to be easily removed during a succeeding process, a self-release intermediate film can be formed between the second rigid substrate 5 and the second thin film 6. This self-release intermediate film can be formed using either an arbitrary type of water repellent agent, a mold release agent or a wax, a tape that foams when heat is applied and thus facilitates its removal, a tape that foams and is removed by irradiation with an active energy ray, such as an ultraviolet ray, or a lift-off resist or porous silicon. Specifically, either Revalpha (product name), by Nitto Denko Corp., Somatac TE (product name), by Somar Corp., Spaceliquid (product name) by Nikka Seiko Co., Ltd., Selfa (product name), by Sekisui Chemical Co., Ltd., or one of either PMGI or LOR resists (product names), by Kayaku MicroChem Co., Ltd. can be employed.

Figure 2E:
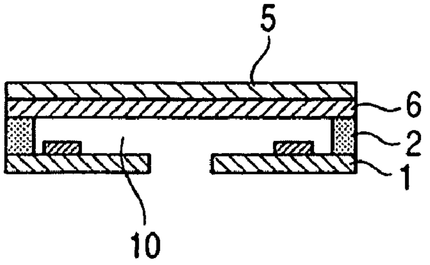

Thereafter, as shown in FIG. 2E, the second thin film 6, formed on the second rigid substrate 5, is bonded to the first thin film 2*a* shaped in accordance with the first pattern 2 (step S6).

During this process, a wafer bonding apparatus available on the market can be employed to use thermal compression to adhere these films, one to the other. As needed, the bonding may either be performed in a vacuum, or the substrate may be heated. At this time, the first thin film 2*a* and the second thin film 6 need not be precisely aligned with each other. Further, if required, various types of adhesives may be employed for bonding.

When either or both of the first thin film 2*a* and the second thin film 6 are composed of resin, the two films can be bonded by heating them to the resin softening point or higher. Especially when the two films are composed of negative photosensitive resins, bonding at a comparatively low temperature is enabled. This is because the first thin film 2*a* is cured during the process performed to form the ink flow paths at the first level, while the second thin film 6 has as yet not been cured, so that for compression bonding, the two films must be heated only to the softening point of the second thin film 6. Furthermore, since deforming the first rigid substrate 1 and the second rigid substrate 5 is difficult during the thermal compression bonding process, occurrences can be reduced during which the resin sags down into the ink flow paths, and when the ink flow paths are formed, they will be accurately shaped.

Figure 2F:
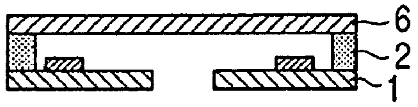

Following this, as shown in FIG. 2F, the second rigid substrate 5 is removed (step S7).

A peeling or a melting method can generally be employed to remove the second rigid substrate 5. At this time, as needed, heating, cooling, irradiation with an active energy ray, immersion of the entire structure in a chemical solution, or water jet processing may be performed.

When a self-release intermediate film is sandwiched between the second rigid substrate 5 and the second thin film 6, the second rigid substrate 5 can be removed, together with the intermediate film, along the interface between the intermediate film and the second thin film 6. Especially when a tape that foams by heat for a removal is employed as a self-release intermediate film, a heating process performed for bonding the first thin film 2*a* and the second thin film 6 may also be employed to foam the tape. Further, the second rigid substrate 5 that is removed may also be employed as a substrate to which another thin film can be bonded. Thus, the second thin film may be formed on the first substrate, without the second rigid substrate having to be used.

Figure 2G:
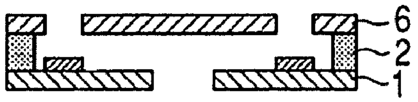

Then, as shown in FIG. 2G, a second pattern is formed at predetermined locations in the second thin film 6, and is used as a second side wall forming member, which provides ink flow paths at the second level (step S8). The ink flow paths at the second level are employed as part of the ink flow paths that are finally produced.

As a second pattern formation method, consonant with the material of the second thin film 6, either photolithography, etching or sandblasting can appropriately be selected. But as described above, from the viewpoint of precision and of processing simplicity, photolithography is notably superior.

Figure 2H:
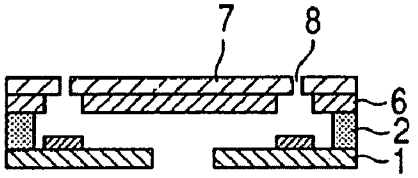

Sequentially, as shown in FIG. 2H, a third thin film 7, which serves as an orifice plate, is deposited on the second thin film 6, formed in accordance with the second pattern (step S9). Ink discharge ports 8 are then formed, at predetermined locations, in the third thin film 7 (step S10). Below the discharge ports 8 are the ink flow paths, i.e., that space is defined. That is, no material member is present below the portions of the third thin film 7 where the discharge ports 8 are to be formed, and these portions are not supported from below.

A material such as a resin, a glass, a ceramic or a metal is employed for the third thin film 7. However, other materials can be employed so long as the discharge ports 8 can be formed later. A photosensitive resin is especially appropriate for the third thin film 7 because machining using photolithography is enabled, and because the third thin film 7 can be easily bonded, using thermal compression, to the second thin film 6, wherein the ink flow paths at the second level are formed. Above all, a negative photosensitive resin employing a cationic polymerization reaction is preferable, and example resins described above for the first thin film 2*a* can also be employed. The material used for the third thin film 7 may be the same as or may differ from that for the second thin film 6; however, while taking into account the bonding of the two films, one to the other, the same material is preferable.

Figure 4:
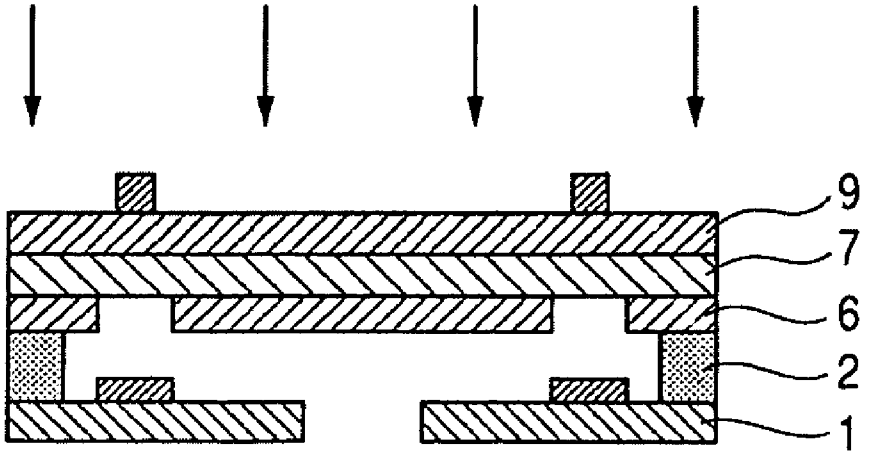
FIG. 4 is a schematic cross sectional view illustrating an example ink jet recording head manufacturing method according to a modified sample of a second embodiment of the present invention.

The process for forming the third thin film 7 on the second thin film 6 can be performed, for example, in the same manner as at steps S4 to S6. At this time, accurate alignment of the second thin film 6 with the third thin film 7 is not required. For example, as shown in FIG. 4, the discharge port 8 may be exposed on the second flow path forming member in a state that the third thin film 7 serving as the discharge port forming member is supported by the third substrate 9. In this case, if the mask used for exposure is directly coupled with the third substrate, excellent positioning accuracy can be obtained.

In addition, by providing a tape which foams and peels by active energy ray such as ultraviolet ray between the third thin film 7 and the third substrate 9, the tape is foamed by light for exposing the discharge port to peel the third thin film 7 from the third substrate 9. Particularly, the area of the mask portion corresponding to the discharge port 8 is smaller than that of the mask (FIG. 3) upon exposure of the second flow path forming member so that the tape can be irradiated by more ultraviolet ray. Accordingly, the foaming area will be larger and the tape can be easily peeled.

The thickness of the third thin film 7 is generally 0.5 to 20 μm; however, the film thickness is not limited to this thickness range.

As a method for forming the ink discharge ports 8, consonant with the material of the third thin film 7, photolithography, etching or sandblasting can appropriately be selected. From the viewpoint of precision and processing simplicity, photolithography is superior, as described above.

Furthermore, an ink repellent layer may be formed on the third thin film 7, as needed. An arbitrary well known ink repellent layer may be employed, and the composition of the layer is not especially limited. For example, a layer made of a fluorinated compound can be employed. As a method for forming the ink repellent layer, spin coating, lamination, slit coating, spray coating, vapor evaporation or plating can be employed, and the process for forming the ink repellent layer may be performed either before or after the ink discharge ports 8 are formed. In addition, the third thin film 7 may be formed on a third rigid substrate, via a self-release water-repellent layer, and may then be bonded to the second thin film 6. The water-repellent layer may be retained on the third thin film 7 and employed as the ink repellent layer.

By employing the above described processing, an ink jet recording head having ink flow paths at two levels can be fabricated.

It should be noted that ink flow paths need not be formed at two levels. When the processes at steps S4 to S7 are repeated in accordance with the three-dimensional design of ink flow paths and ink discharge ports, the ink flow paths are formed using thin films and the orifice plate is bonded. Thus, a complicated three-dimensional shape provided by three or more thin films can also be obtained. Of course, it is also acceptable that a thin film where the ink flow paths are to be formed is provided only at one level.

First Embodiment

First, a negative photosensitive resin having a cationic photopolymerizable property and containing elements shown in Table 1 was dissolved, at a density of 55 wt %, in a solvent mixture of methyl isobutyl ketone and diglyme, and a coating liquid was obtained. Then, using spin coating, a first thin film 2*a* was deposited on a silicon substrate 1 whereon electrothermal conversion elements were formed as ink discharge energy generating elements 3 (FIG. 2B). Sequentially, the substrate 1 was baked using a hot plate at a temperature of 90° C. Following this, pattern exposure was performed using FPA-5500 (product name), an i-line stepper by Canon Inc., to form ink flow paths at the first level. Following this, the structure was baked at 90° C. for four minutes, and was developed using methyl isobutyl ketone/xylene=2/3, and the ink flow paths at the first level were formed. The thickness of the first thin film 2*a* after development was 18 μm.

TABLE 1

| Element | Product Name | Maker Name | Mixing Ratio |
|---|---|---|---|
| Epoxy Resin | EHPE3150 | Daicel Chemical Industries, Ltd. | 92 Pts. Mass |
| Photopolymerization Initiator | SP-170 | ADEKA Corp. | 2 Pts. Mass |

TABLE 1-continued

| Element | Product Name | Maker Name | Mixing Ratio |
|---|---|---|---|
| Polymerization Accelerator | SP-100 | ADEKA Corp. | 2 Pts. Mass |
| Silane Coupling Agent | A-187 | Nippon Unicar Co., Ltd. | 4 Pts. Mass |

Next, the ink supply port 4 was formed on the reverse of the silicon substrate 1. First, a cyclized rubber was applied as a protective film to the face of the silicon substrate 1, in which the ink flow paths at the first level were formed. Then, oxide silicon, previously deposited on the reverse, was patterned, and while the silicon pattern was employed as a mask, anisotropic etching was performed for the substrate 1 that was immersed in a tetramethylammonium hydroxide solution (22%, 83° C.) for 16 hours. The ink supply port 4 was formed in this manner, and thereafter, the protective film was removed.

Sequentially, thereafter, a silicon substrate 5 was prepared, and Somatac TE (product name), by Somar Corp., was glued, as an intermediate film, to the surface of the silicon substrate 5. This intermediate film is a thermal expansion adhesive film that is foamed by heating and is easily peeled off, and in this embodiment, a sheet was employed that is foamed at 120° C. Then, spin coating was used to apply a coating liquid, a cationically photopolymerizable negative photosensitive resin included in Table 1, to the intermediate film, and a second thin film 6 was obtained. Thereafter, the entire structure was baked, using a hot plate at a temperature of 90° C. Then, sequentially, using wafer bonding system EVG520 (product name), by EV Group, the second thin film 6 was bonded, under heat and pressure conditions of 100° C. and 2000N, to the first thin film 2*a* that was used as the ink flow paths at the first level. For this process, precise alignment is not required. While the bonded state was maintained, the temperature was increased to 120° C., in order to foam the thermal release adhesive sheet. As a result, the silicon substrate 1 and the thermal release adhesive sheet were removed. Sequentially, thereafter, exposure of the pattern for ink flow paths at the second level was performed using i-line stepper FPA-5500 (product name), by Canon Inc. Following this, the resultant structure was baked at 90° C. for four minutes, and developed using methyl isobutyl ketone/xylene=2/3. Thus, in this manner, the ink flow paths at the second level were obtained. And after development, the thickness of the second thin film 6 was 21 μm.

Moreover, another silicon substrate was prepared, and Somatac TE (product name), by Somar Corp., was glued as an intermediate film to the surface of the substrate. Then, spin coating was used to apply a coating liquid of cationic photopolymerizable negative photosensitive resin, shown in Table 1, to the intermediate film, and a third thin film 7 was formed. Thereafter, the same bonding and removal processing was performed as for the second thin film 6. At this time, precise alignment is not required. In addition, slit coating was employed to form an ink repellent layer on the surface of the third thin film 7. Following this, pattern exposure for ink discharge ports 8 was performed using i-line stepper FPA-5500 (product name), by Canon Inc. Sequentially, the resultant structure was baked at 90° C. for four minutes, and developed using methyl isobutyl ketone/xylene=2/3 to obtain ink discharge ports 8. After development, the thickness of the third thin film 7 was 24 μm.

Sequentially, in order to completely cure the first to the third thin films, the entire structure was heated for one hour at 200° C., following which the ink supply members were finally attached to the ink supply port 4. This completed the fabrication of the ink jet recording head.

Second Embodiment

A second embodiment of the present invention will now be described.

The second embodiment differs from the first embodiment in that a UV release adhesive sheet is employed as an intermediate film formed between a second thin film 6 and a quartz substrate 5.

The process up to the step illustrated in FIG. 2C was performed in the same manner as in the first embodiment.

Then, the quartz substrate 5 was prepared, and an intermediate film (not shown) made of Selfa (product name), by Sekisui Chemical Co., Ltd., was glued to the surface. This intermediate film is a UV release adhesive film that is foamed and is easily removed by UV exposure. Then, spin coating was used to apply a coating liquid of a cationically photopolymerizable negative photosensitive resin, shown in Table 1, to the intermediate film, and a second thin film 6 was obtained. Thereafter, the structure was baked by a hot plate at a temperature of 90° C. (FIG. 2D).

Figure 3:
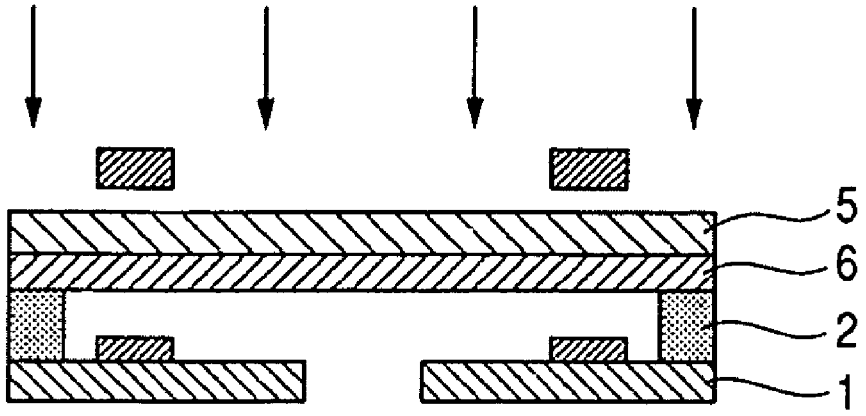
FIG. 3 is a schematic cross sectional view illustrating an example ink jet recording head manufacturing method according to a second embodiment of the present invention.

Following this, using wafer bonding system EVG520 (product name), by EV Group, the first thin film 2*a* that was used for ink flow paths at the first level was bonded to the second thin film under the heat and pressure conditions of 100° C. and 2000N. At this time, accurate alignment is not required. Sequentially, as shown in FIG. 3, while bonding of the quartz substrate 5 and the second thin film 6 was maintained, mirror projection aligner MPA-600FA (product name), by Canon Inc., was employed and the second thin film 6 was exposed, via the quartz substrate 5, to form ink flow paths at the second level. At the same time, the intermediate film was peeled off by UV irradiation, and the quartz substrate 5 and the UV release adhesive sheet were removed. Thereafter, the developing process was performed for the resultant structure, and the state illustrated in FIG. 2G was obtained.

The following process was performed in the same way as in the first embodiment, and an ink jet recording head was obtained.

The method that uses the UV release adhesive sheet to form the second thin film 6 can also be employed when discharge ports 8 are to be formed using a third thin film 7.

In addition, a UV release adhesive sheet other than that used in this embodiment can also be employed. For example, a sheet can be employed such that, in order to obtain a UV foaming property, an azide compound is added to acrylic polymer, which is a base resin.

In this embodiment, the light irradiation process for forming ink flow paths and discharge ports can also be employed to remove, from the substrate, thin films in which the ink flow paths or the discharge ports are formed. Therefore, a removal process is not separately provided, and the processing can be simplified.

First Comparison Example

An ink jet recording head was prepared using the same method as that for the first embodiment, except that before the second thin film was to be bonded to the first thin film, ink flow paths at the second level were formed in the second thin film, and before the third thin film was to be bonded to the second thin film, ink discharge ports were formed in the third thin film. The thickness of the first thin film after development was 17 μm, the thickness of the second thin film after development was 20.5 μm, and the thickness of the third thin film after development was 24 μm.

(Evaluation of Precision in the Shape of Ink Flow Paths)

The ink flow paths and ink discharge ports of ink jet recording heads obtained in the first and second embodiments and first comparison example were cut out, and cross sections were observed, using a scanning electron microscope, to evaluate the shape precision as follows.

A: The shape was precisely formed

B: The locations of the ink flow paths at the first level and the second levels and the ink discharge ports were not precisely located, and the ceiling portions of the ink flow paths sagged down into the ink flow paths.

(Evaluation of Reliability)

The ink jet recording heads obtained in the first and second embodiments and the first comparison example were immersed in ink BCI-7C (product name), by Canon Inc., and were stored at 60° C. for three months. Later, the ink jet recording heads were removed from the ink, and were observed using an optical microscope.

A: No peel was found on the interfaces at the silicon substrate, the ink flow paths for the first level and the second level and the orifice plate for the ink jet recording head.

B: Peel was found at the interfaces of the silicon substrate, the ink flow paths for the first and second levels and the orifice plate, which is 50% or more of the total area of the ink jet recording head.

(Evaluation of Printing Quality)

The ink jet recording heads obtained for the first and second embodiments and the first comparison example were attached to recording apparatuses, and printing was performed by loading ink BCI-9Bk (product name), by Canon Inc.

A: Ink discharge accuracy was high, and the quality of the obtained print material was high.

B: Ink discharge accuracy was low, and the obtained print material was not clear and the quality was low.

Table 2 shows an evaluation of the precision with which ink flow paths were shaped, and the reliability and the printing quality obtained by the ink jet recording heads prepared for the first and the second embodiments and for the first comparison example.

TABLE 2

| | Shape Precision For Ink Flow paths | Reliability | Printing Quality |
|---|---|---|---|
| First Embodiment | A | A | A |
| Second Embodiment | A | A | A |
| First Comparison Example | B | B | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-196326, filed Jul. 27, 2007, which is hereby incorporated by reference herein its entirety.

What is claimed is:

1. A manufacturing method, for a liquid discharge head that includes a discharge port forming member, where discharge ports for discharging liquid are formed, and liquid flow paths that communicate with the discharge ports, comprising the steps of:

mounting, on a substrate, a first side wall forming member for forming portions of side walls of the liquid flow paths;

mounting, on the first side wall forming member, a first photosensitive material layer that serves as a second side wall forming member for formation of other portions of the side walls and is supported on another substrate, wherein an adhesive agent to be foamed by light irradiation is located between the other substrate and the first photosensitive material layer;

exposing the first photosensitive material layer and the adhesive agent to light that has passed through the other substrate to foam the adhesive agent;

removing the other substrate from the first photosensitive material layer;

patterning the first photosensitive material layer to provide the second side wall forming member by removing a portion of the first photosensitive material layer which has not been exposed;

forming, on the second side wall forming member, a second photosensitive material layer that serves as the discharge port forming member; and patterning the second photosensitive material layer to provide the discharge ports.

2. The liquid discharge head manufacturing method according to claim 1, wherein the first and the second photosensitive material layers contain epoxy resin.

3. The liquid discharge head manufacturing method according to claim 1, wherein the step of patterning the second photosensitive material layer is performed at locations that correspond to the discharge ports, in space that is used as the flow paths.

4. The liquid discharge head manufacturing method according to claim 1, wherein forming the discharge port forming member on the second side wall forming member includes:

preparing a third substrate on which the second photosensitive material layer is formed; and mounting on the second side wall forming member the second photosensitive material layer that is supported on the third substrate, and exposing the second photosensitive material layer to light that has passed through the third substrate.

5. The liquid discharge head manufacturing method according to claim 4, wherein an adhesive agent, to be foamed by light irradiation, is located between the third substrate and the second photosensitive material layer, and when the adhesive agent is foamed by ultraviolet irradiation, portions of the second photosensitive material layer and the third substrate are removed.

* * * * *